US012743444B2

(12) United States Patent
Chermside et al.

(10) Patent No.: US 12,743,444 B2
(45) Date of Patent: Sep. 22, 2026

(54) SYNCHRONIZED SCHEDULE FOR STAGGERED BATCH PROCESSING

(71) Applicant: Capital One Services, LLC, McLean, VA (US)

(72) Inventors: Michael Brooke Smith Chermside, Ardmore, PA (US); Xuan Li, Fremont, CA (US); Leonhardt deWaal, Orinda, CA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/988,866

(22) Filed: Dec. 19, 2024

(65) Prior Publication Data

US 2026/0178614 A1 Jun. 25, 2026

(51) Int. Cl.
*G06F 16/27* (2019.01)
*G06F 16/23* (2019.01)

(52) U.S. Cl.
CPC ........ *G06F 16/273* (2019.01); *G06F 16/2379* (2019.01)

(58) Field of Classification Search
None
See application file for complete search history.

(56) References Cited

U.S. PATENT DOCUMENTS 10,953,328 B1 * 3/2021 Schuster ............ G06F 9/45558
2008/0208865 A1 * 8/2008 Abrink .................. G06F 16/275
2012/0221454 A1 * 8/2012 Morgan ................. G06Q 30/06 705/37
2015/0261563 A1 * 9/2015 Guerin .................... G06F 9/466 707/703
2020/0136921 A1 * 4/2020 Doshi ................... H04L 41/142
2024/0143453 A1 * 5/2024 Kaushik .................. G06F 3/067
2025/0181423 A1 * 6/2025 Bhola ..................... G06F 16/27
2025/0190966 A1 * 6/2025 Gutierrez-Sheris .... G06Q 20/20
2025/0217345 A1 * 7/2025 Lai .......................... G06F 9/466

FOREIGN PATENT DOCUMENTS

WO WO-2024032632 A1 * 2/2024 ............ G06F 9/526

* cited by examiner

*Primary Examiner* — Richard L Bowen
(74) *Attorney, Agent, or Firm* — Foley & Lardner LLP

(57) ABSTRACT

A method and related system for performing staggered synchronization across different database shards includes obtaining a database transaction request indicating updates to a first record and a second record during a first synchronization of the second record, the first synchronization separating a first unlocked period of the second record from a second unlocked period of the second record. The method further includes selecting an effective unlocked period in response to obtaining the database transaction request during the first synchronization, updating an update sequence of the second record to indicate that the database transaction caused by the database transaction request occurred during the effective unlocked period, and updating an update sequence of the first record to indicate that the database transaction occurred during the effective unlocked period.

20 Claims, 4 Drawing Sheets

400

SYNCHRONIZED SCHEDULE FOR STAGGERED BATCH PROCESSING

SUMMARY

End-of-day batch processes include a wide array of data-related tasks accumulated throughout the day. These tasks encompass data validation operations, data currency operations, backup operations to protect against data loss, and operations involving complex analytical computations. These tasks are often run on a regular schedule (e.g., daily) to maintain system health and reduce the risk of an error being propagated in a system. Batch processing enables efficient handling and analysis of large volumes of data, facilitating informed decision-making and effective operational planning. End-of-day batch processing is an important component in maintaining the integrity and smooth operation of IT systems across diverse industries, guaranteeing that data is accurately reflected and readily available when required.

In the context of batch operations, the migration of computing operations from a centralized computing system (e.g., an on-premises mainframe) to a distributed computing environment can offer significant benefits with respect to resource scaling and crisis response. However, batch processing in distributed computing environments, particularly those involving database sharding, presents several challenges. A significant hurdle presents itself when one or more processes (e.g., the initiation of a database transaction) concurrently access and modify the same data sets during batch operations. While centralized systems can lock all records in a database and store these database transactions in a buffer with relative ease, such mass-locking operations can be both technically difficult and operationally ill-advised in a distributed computing environment and can lead to data anomalies and compromised integrity.

Some embodiments may overcome the technical issue described above by performing staggered synchronizations or other staggered batch operations across a distributed database. Some embodiments may obtain a database transaction request indicating updates to a first record stored in a first database shard and a second record stored in a second database shard during a first synchronization. The first synchronization may separate a first unlocked period of the second record from a second unlocked period of the second record. In some embodiments, the database transaction request may be obtained during a first unlocked period of the first record. Based on obtaining the database transaction request during the first synchronization, some embodiments may then select an effective unlocked period based on the first or second unlocked period of the second record and update the second record stored in the second database shard after the first synchronization. As part of updating the second record, some embodiments may update an update sequence of the second record to indicate that a database transaction caused by the database transaction request occurred during the unlocked period. Furthermore, some embodiments may synchronize the first record during a second synchronization by updating an update sequence of the first record to indicate that the database transaction occurred during the effective unlocked period.

Various other aspects, features, and advantages will be apparent through the detailed description of this disclosure and the drawings attached hereto. It is also to be understood that both the foregoing general description and the following detailed description are examples and not restrictive of the scope of the invention.

BRIEF DESCRIPTION OF THE DRAWINGS

Detailed descriptions of implementations of the present technology will be described and explained through the use of the accompanying drawings.

Figure 1:
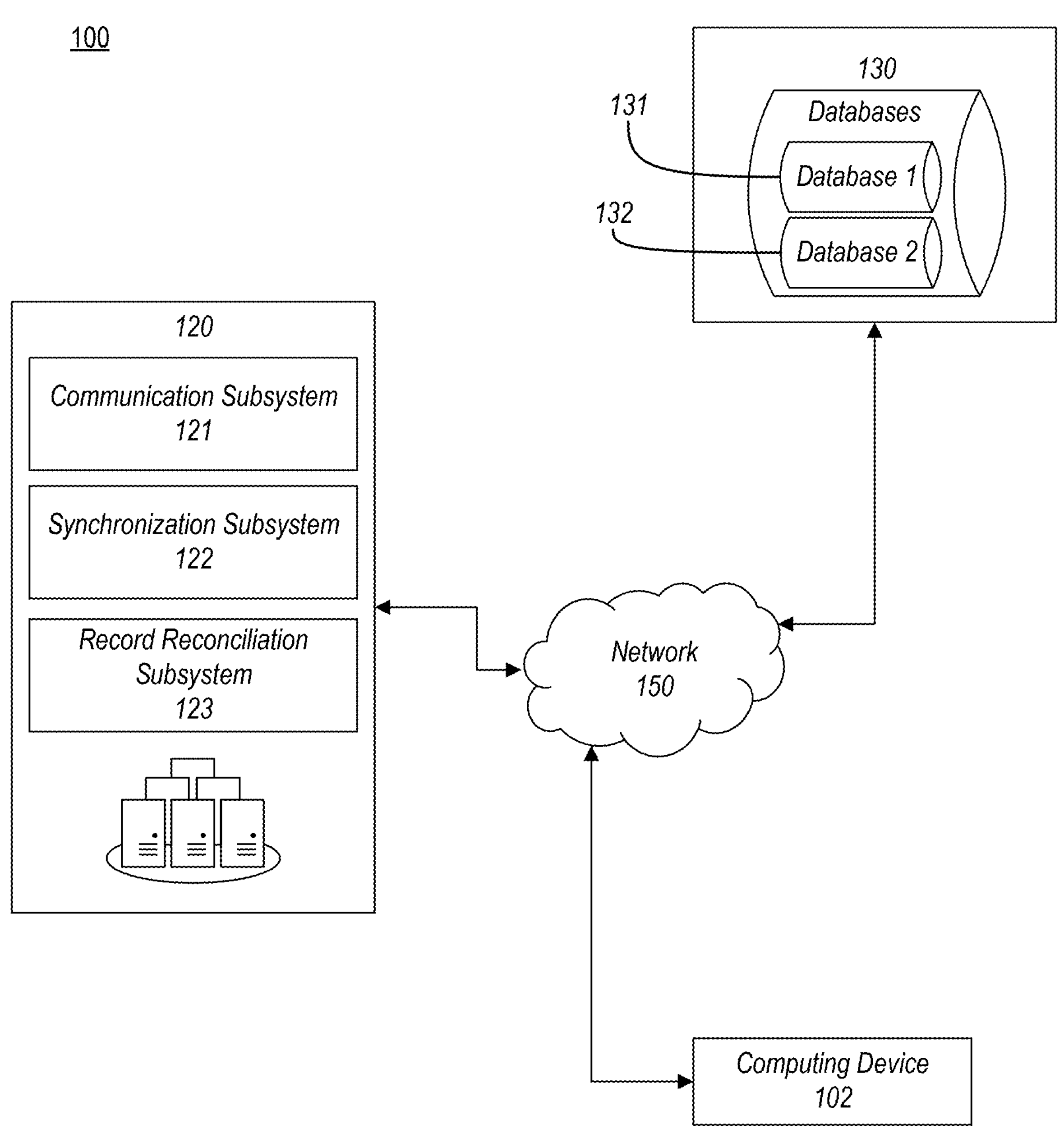
FIG. 1 illustrates a system for performing staggered synchronization across records stored in different database shards, in accordance with some embodiments.

The technologies described herein will become more apparent to those skilled in the art by studying the detailed description in conjunction with the drawings. Embodiments of implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

FIG. 1 illustrates a system for performing staggered synchronization across records stored in different database shards, in accordance with some embodiments. The system 100 includes a computing device 102. The computing device 102 may include computing devices such as a desktop computer, a laptop computer, a wearable headset, a smartwatch, another type of mobile computing device, a transaction device, etc. In some embodiments, the computing device 102 may communicate with various other computing devices via a network 150, where the network 150 may include the internet, a local area network, a peer-to-peer network, etc. The computing device 102 may send and receive messages through the network 150 to communicate with a set of servers 120, where the set of servers 120 may include a set of non-transitory storage media storing program instructions to perform one or more operations of subsystems 121-123. For example, the computing device 102 may send instructions to the set of servers 120 that effectuates a set of database transactions which updates records of a set of databases 130, such as updating a first record of the first database shard 131 and a second record of the second database shard 132.

While one or more operations are described herein as being performed by particular components of the system 100, those operations may be performed by other components of the system 100 in some embodiments. For example, one or more operations described in this disclosure as being performed by the set of servers 120 may instead be performed by the computing device 102. Furthermore, some embodiments may communicate with an application programming interface (API) of a third-party service via the network 150 to perform various operations disclosed herein. For example, some embodiments may provide training data for an encoder model to an API of a service, where the service may respond with a trained encoder model that was trained with the training data.

In some embodiments, the set of computer systems and subsystems illustrated in FIG. 1 may include one or more computing devices having electronic storage or otherwise capable of accessing electronic storage, where the electronic storage may include the set of databases 130. The set of databases 130 may include values used to perform operations described in this disclosure.

Some embodiments may use a communication subsystem 121 to obtain a transaction request from the computing device 102 or another electronic device. For example, some embodiments may obtain a request to transfer an amount from a first user account to a second user account, where such a request would effectuate database transactions for the first database shard 131 and the second database shard 132. The communication subsystem 121 may also cause or act as a medium for messages between different database shards or other components of a database system, such as the set of databases 130. For example, the communication subsystem 121 may be used to convey effective dates or other values indicating or associated with effective periods to one or more database shards of the set of databases 130. A database shard may be a portion of a database that is stored on a different physical or virtual machine, such that a single database may be distributed across multiple database shards to enable horizontal scaling. For example, a distributed database may be distributed across different servers such that each server includes a database shard of the distributed database. By enabling operations that allow database sharding and a horizontal distribution of data in a database, various database operations (e.g., database transactions to change the value of database records) can be scaled in accordance with the size of the database.

In some embodiments, the communication subsystem 121 may determine which database shard to use for data storage. For example, some embodiments may obtain a transaction request from a user using the computing device 102, where the transaction request initiates a fund transfer from a first account stored in the first database shard 131 to a second account stored in the second database shard 132. The communication subsystem 121 may use a micro service to process this fund transfer, where the micro service may then determine that the records related to the transaction request are located in the first and second database shards. As described elsewhere in this disclosure, some embodiments may use the respective database shards to modify operations related to the records.

Some embodiments use a synchronization subsystem 122 to effectuate a set of synchronizations or other operations for data stored in the set of databases 130. For example, some embodiments may use the synchronization subsystem 122 to perform synchronization of a record, where such synchronization may be performed as a part of day-end operations for the record. A synchronization may be performed via an update sequence, during which transaction reconciliation, database inconsistency correction, data backup generation, data report generation, or similar operations may be performed. Such synchronization may ensure that quantities related to database transactions sum to a balanced value. For example, some embodiments may perform day-end operations that reconcile transaction amounts out of an account value with transaction amounts into the account value. Furthermore, as a part of or independent of synchronization operations, some embodiments may report transaction amounts or other values of a record to an analysis application.

The synchronization subsystem 122 may initiate a synchronization that occurs during a locked period ("locked window"). During the locked window, one or more records of the set of databases 130 may be locked and prevented from further updates. For example, in the context of financial databases, a record for a user account may be locked such that database transaction requests are prevented from modifying the values of the user account during the locked window. Some embodiments obtain transaction requests indicating updates to a first record over multiple unlocked periods, where a first synchronization may separate a first unlocked period of the first record from a second unlocked period of the first record. For example, some embodiments may obtain instructions that cause changes to a user configuration on a first day representing a first unlocked period and a second day representing a second unlocked period, where a locked window may be applied during a synchronization operation that separates the first day from the second day. It should be understood that an unlocked period for a record can be distinguished from a time interval of the record being unlocked based on the time during which a record is locked. Some embodiments may also apply additional criteria for a time interval to be considered as an unlocked period. For example, some embodiments may require that an unlocked period be considered greater than 1 hours, greater than 10 hours, greater than 24 hours, etc. Some embodiments may require that any locked period used to define an unlocked period be greater than a minimum time interval, such as greater than 1 second, greater than 10 seconds, greater than 30 seconds, greater than 1 minute, greater than 10 minutes, etc. For example, the time in which a database transaction that is effectuated in less than 1 second may not qualify as a locking period if a threshold requirement is that a locking period must be at least 5 minutes. Furthermore, some embodiments may combine multiple unlocked periods of a day together to define the combined data the data for the unlocked period.

Furthermore, though some embodiments may perform locking operations, some embodiments may forego locking. For example, some embodiments may apply an non-locking update sequence that separates, at a checkpoint time of the update sequence, a first period from a second period with respect to data in the database shard. The update sequence for a shard may be or include a checkpoint process that includes operations that causes a computer system to perform summation operations or other summarization operations for the data in the shard and report the output of the summarization operations. Such a checkpoint process may be described as a recording the state of records in the shard during a recorded period (e.g., at the end of the recorded period).

Some embodiments may use the synchronization subsystem 122 to perform synchronization operations for different records during locked windows of the different records. For example, some embodiments may use the synchronization subsystem 122 to lock a first record stored in the first database shard 131 from the time of 02:00 CST to 03:00 CST in order to perform a first synchronization. Some embodiments may then obtain a transaction request from the computing device 102 at 02:30 CST, which is during the locked window of the first synchronization. Some embodiments may then perform operations to reconcile possible discrepancies arising from attempts to effectuate a transaction involving a locked record, as described elsewhere in this disclosure.

Some embodiments may use a record reconciliation subsystem 123 to perform operations to maintain consistency between records of a database system. After obtaining a database transaction request during a synchronization of a first record, some embodiments may select an effective unlocked period (or an effective recorded period) in which to assign a database transaction caused by the database transaction request. For example, if "day 1" is a label for a first unlocked period of a first record stored in a first database shard, and "day 2" is a label for a second unlocked period of the first record, a first synchronization of the first record may separate "day 1" from "day 2." Some embodiments may obtain a transaction indicating an update to the first record and a second record stored in a second database shard, where the second record is not undergoing a synchronization operation that locks the second record. Some embodiments may then select "day 1" as an effective unlocked period and then update the update sequences of the first record and the second record in their separate database shards to indicate that the database transaction occurred during the effective unlocked period. In many cases, such operations permit staggered synchronization operations. For example, after performing a first synchronization of the first record, some embodiments may perform a second synchronization of the second record at a time after the first synchronization. In some embodiments, the record reconciliation subsystem 123 may perform different types of reconciliation operations based on a selected effective unlocked period. For example, after a determination that the selected effective unlocked period is "day 1," some embodiments may perform back-dating operations for the record for which a synchronization operation or other locking operation had occurred. Alternatively, after a determination that the selected effective unlocked period is "day 2," some embodiments may perform forward-dating operations for the record for which the synchronization operation or other locking operation had not yet occurred.

Figure 2:
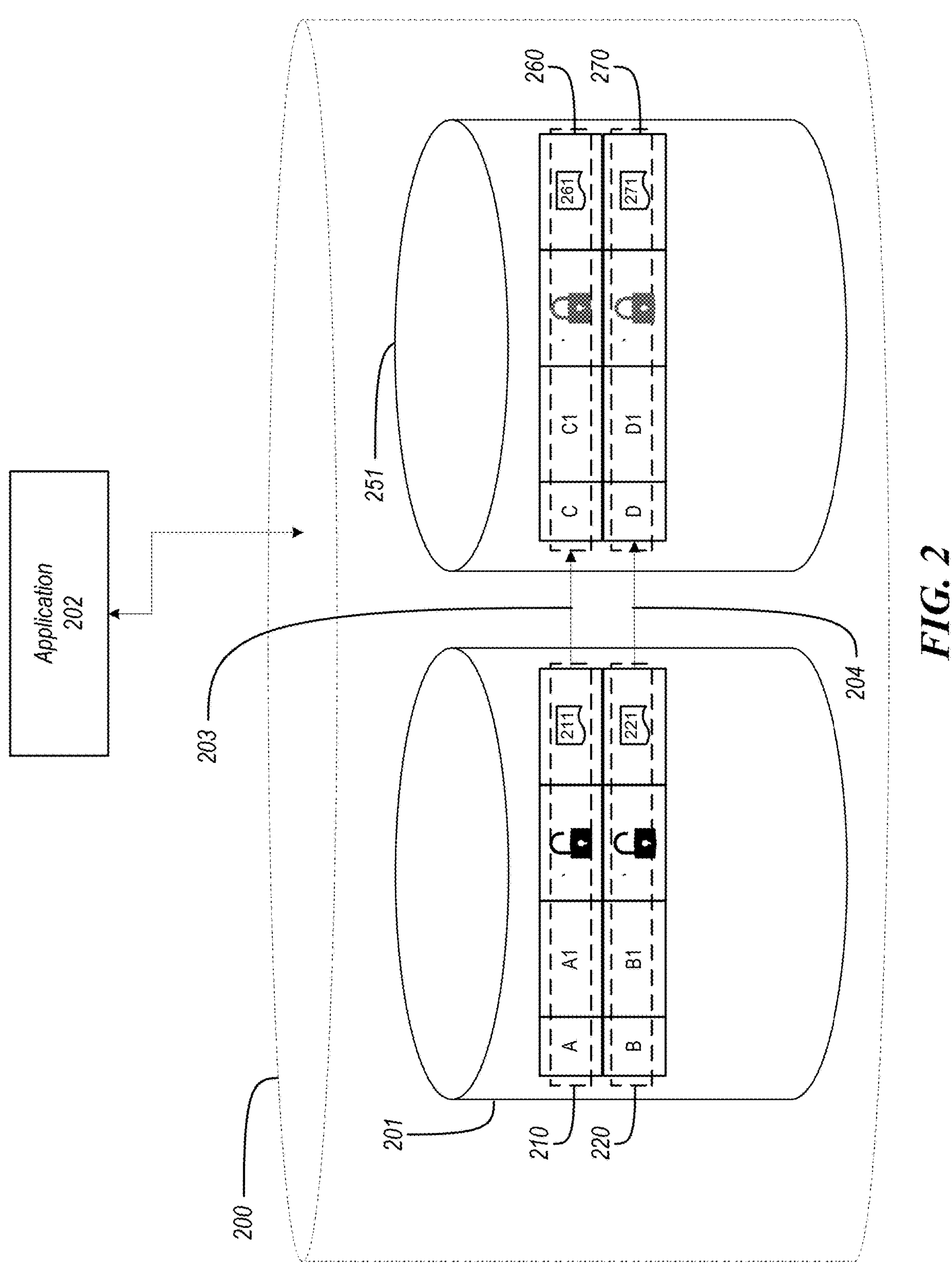
FIG. 2 illustrates a conceptual diagram of a distributed database that permits staggered synchronization, in accordance with some embodiments.

FIG. 2 illustrates a conceptual diagram of a distributed database that permits staggered synchronization, in accordance with some embodiments. A database system 200 includes a first database shard 201 and a second database shard 251. The first database shard 201 includes a first record 210 and a second record 220. The second database shard 251 includes a third record 260 and a fourth record 270. At a first time, the first database shard 201 is unlocked such that database transaction requests received by the first database shard 201 may update records of the first database shard 201. For example, if the first database shard 201 receives a transaction request to perform a database transaction to update the first record 210, the first database shard 201 may update the first record 210. Furthermore, at the first time, the second database shard 251 is locked in a locked window such that records of the second database shard 251 (e.g., the third record 260 and the fourth record 270) are not updated by operations other than those permitted during the locked window. Sharding methods may be based on a variety of sharding techniques, such as algorithmic sharding (e.g., hashed sharding), entity-based sharding (e.g., data shared by grouped users are kept on a single server), geography-based sharding (e.g., data indicated to be used within a geographic region is grouped into a server for that region), A sharded architecture may be created or configured with custom-created database applications or may be performed using existing database services (e.g., a MongoDB™ database, Amazon™ database, etc.)

Some embodiments may determine which database shards to use when allocating a record based on network resources related to each database shard, their geographic locations, available resources, etc. For example, some embodiments may store the first record 210 in the first database shard 201 based on a result indicating that a user identified by the first record 210 will experience increased network performance when accessing the first database shard 201. Furthermore, some embodiments may rescale resources based on a determination that locking operations for a database shard are too frequent. For example, some embodiments may perform synchronization operations on a per-shard basis, such that all records of the first database shard are locked during a first locked period and all records of the second database shard are locked for a second locked period.

During the first time, an application 202 receives a request to perform a first transaction 203 and a second transaction 204, where the first transaction 203 involves updating the first record 210 and the third record 260, and where the second transaction 204 involves updating the second record 220 and the fourth record 270. In some embodiments, the first transaction 203 may involve instructions to update the first record 210 and the third record 260 (e.g., a transfer of funds of an account represented by the first record 210 to the third record 260). Furthermore, the second transaction 204 may involve instructions to update the second record 220 and the fourth record 270.

At the first time, the third record 260 is undergoing a synchronization operation that locks the third record 260 from updates during a locked window. For example, some embodiments may receive the first transaction 203 while a checkpoint process is being performed to update the third record 260, where the checkpoint process may separate an earlier checkpoint-recorded process for the first database shard 201 from a later checkpoint-recorded process for the first database shard 201. In conventional systems that do not perform operations described in this disclosure, receiving the transaction can create problematic disparities in the assigned checkpoint-recorded periods for the transaction. For example, a conventional system may indicate that the first transaction 203 is performed during the later checkpoint-recorded period for the first database shard 201 while also indicating this same first transaction 203 is performed during the earlier checkpoint-recorded period for the second database shard 251.

To overcome the deficiencies of such conventional systems, some embodiments may assign an effective unlocked period (or, effective recorded period in cases where locking is not required during an update sequence) to the first transaction 203 and initiate a back-dating or forward-dating operation for the transaction with respect to one or both of the first record 210 and the third record 260. For example, some embodiments may specify an effective recorded period (to be used an effective date) to be applied to the first transaction 203 for both records in the first database shard 201 and the second database shard 251. In cases where a synchronization operation regularly locks a record, an unlocked period may be treated as an unlocked period, where an unlocked period for a record is one during which database transactions can be initiated and effectuated for a database record. In contrast, during a locked period (e.g., a period during which a synchronization operation is being performed on the record), database transaction unrelated to the locked period can be prevented or assigned to a queue for later execution.

In cases where an effective unlocked period for a record is selected as being before a current synchronization period (or another type of locking window), some embodiments may perform back-dating operations. For example, some embodiments may assign an effective timestamp for the first transaction 203 that maps to an effective unlocked period occurring before the current time. In response, some embodiments may update the first record value "A1" of the first record 210 at the current time or update the update sequence 211 for later updates that are scheduled to occur before a synchronization of the first record 210. Furthermore, some embodiments may update the third record value "C1" or the third update sequence 261 to indicate that the first transaction 203 is scheduled to occur during the effective unlocked period. It should be understood that, in cases where locking for a database shard is not performed, some embodiments may select an effective recorded period that is characterized by being before or after a non-locking process (e.g., select an effective recorded date that is either earlier than or later than a checkpoint process).

In cases where an effective unlocked period for a record is selected as being after a current synchronization period (or another type of locking window), some embodiments may perform forward-dating operations. For example, some embodiments may assign an effective timestamp for the first transaction 203 that maps to an effective unlocked period occurring after the current time. In response, some embodiments may update the second record value "B1" of the second record 220 at the current time or update an update sequence 221 for later updates that are scheduled to occur after a synchronization of the second record 220. Furthermore, some embodiments may update the fourth record value "D1" of the fourth record 270 or the fourth update sequence 271 to indicate that the second transaction 204 is scheduled to occur during the effective unlocked period.

In some embodiments, an update sequence may act as a checkpoint process that creates a snapshot report of some or all of the records of a database shard. In such a snapshot report, some or all of the records are clear. Furthermore, a time of the update sequence (either a beginning time, ending time, or a time between the beginning or ending time of the update sequence) may represent a checkpoint between two unlocked periods. Furthermore, while some embodiments may represent periods separated by checkpoints as unlocked period, some embodiments may forego locking operations. For example, some embodiments may perform an update sequence on a database shard without locking the database shard, such that the starting time of the update sequence may represent a checkpoint separating a first period (e.g., a first day) from a second period (e.g., a second day following the first day). For example, operations described in this disclosure which involving locking may instead involve non-locking operations.

Figure 3:
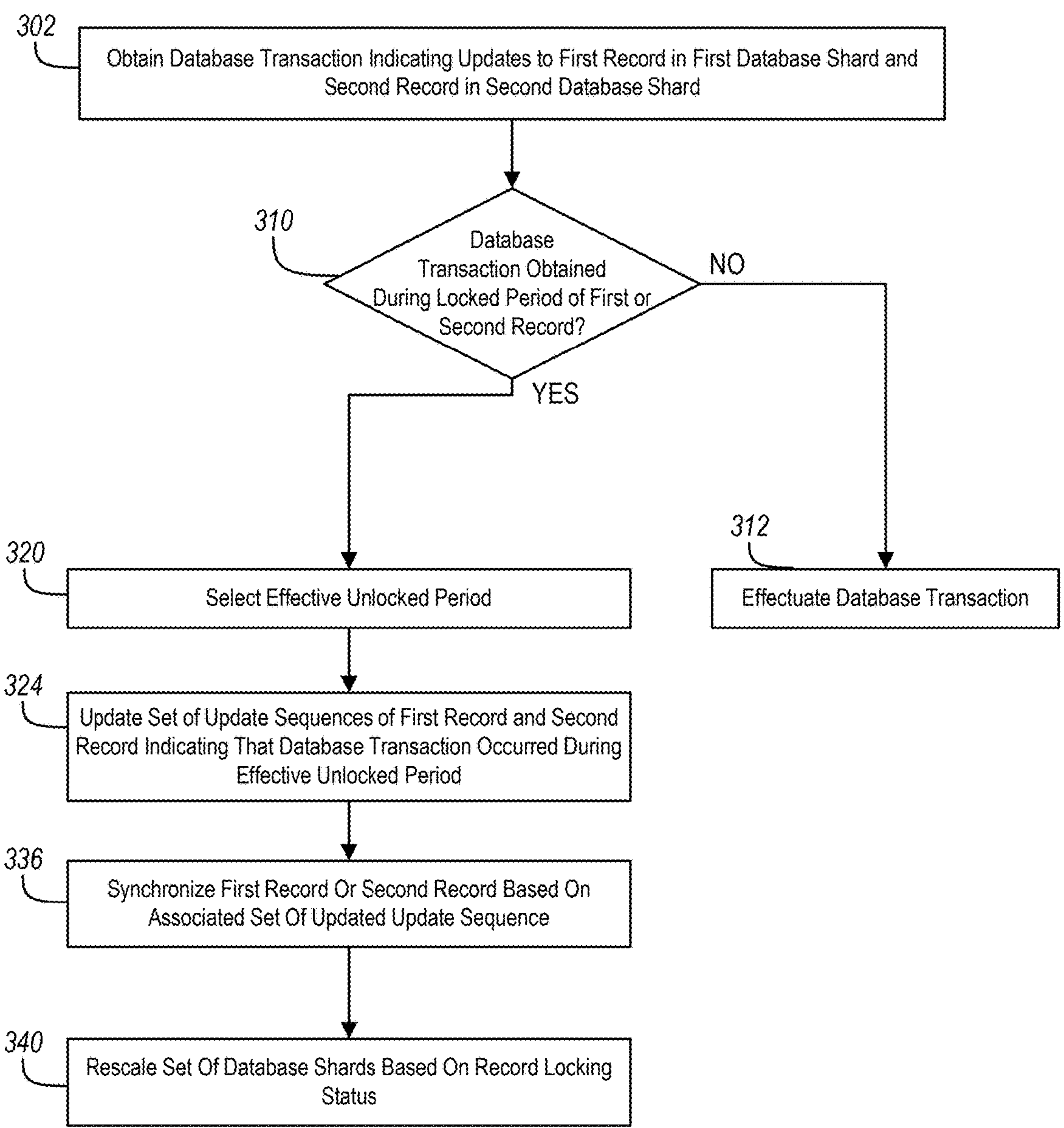
FIG. 3 is a flowchart of a process for performing staggered synchronization across records stored in different database shards, in accordance with some embodiments.

FIG. 3 is a flowchart of a process 300 for performing staggered synchronization across records stored in different database shards, in accordance with some embodiments. Some embodiments may obtain a database transaction request indicating updates to a first record in a first database shard and a second record in a second database shard, as indicated by block 302. A database transaction may be caused by various types of requests or data provided by one or more computing devices. For example, a user may send a request to a server to fulfill a bill payment using their user account as a source of the funds. Some embodiments may then interpret the request by first identifying the user's account identifier and a corresponding database shard storing a user record for the account. Some embodiments may also identify a recipient account identifier and determine where the recipient account identifier is stored based on the database shard. Some embodiments may then initialize a database transaction that causes a reduction in a value of the first account record and an increase in a value of the second account record.

As described elsewhere in this disclosure, some embodiments may obtain one or more database transaction requests during an update sequence. For example, some embodiments may obtain one or more database transaction requests during a multi-account checkpoint process that records "day-end" balances. In some embodiments, the multi-account checkpoint process for a database shard may create a lock on the database shard. Alternatively, in some embodiments, the multi-account checkpoint process may be performed without a global lock on a database shard.

Some embodiments may determine whether the database transaction request is obtained during a locked period of the first or second record, as indicated by block 310. Some embodiments may retrieve a timestamp associated with a database transaction, a transaction request, or another type of message that caused the database transaction. Some embodiments may use the timestamp to determine whether the database transaction caused by the database transaction request is obtained during a synchronization or other type of locked period for a record. For example, some embodiments may obtain a timestamp in the UNIX timestamp format indicating a specific date and time for a transaction. Some embodiments may then determine whether the timestamp had occurred within a locked window between the time interval defined by the UNIX timestamp values 1678280400 and 1678284000. In order to obtain the time interval for a synchronization operation, other batch operation, or other locking operation that locks a record of a database shard, some embodiments may send a query to a containerized application that controls or has access to information from the database shard. The containerized application may then provide a response indicating a result indicating whether an obtained transaction occurs within the known locked period. Alternatively, the containerized application may provide a response indicating the known locked period, where some embodiments may use another application, service, or set of operations to determine whether an obtained transaction occurred within the known locked period. For example, some embodiments may query a containerized application and receive, in response, a time range indicating one or more day-end operations periods for a record during which the record is locked. Furthermore, in the cases where a non-locking updating sequence is used to separate earlier periods from later periods, some embodiments may use a duration of operation of the non-locking update sequence in lieu of a locked period when performing operations of the block 310.

Some embodiments may use a data table of known locked periods (or known durations for a non-locking update sequence) to determine whether a database transaction request is obtained during a synchronization of the first or second record. For example, some embodiments may receive a first transaction related to two records stored in two different database shards and, in response, compare the first transactions to time periods indicated by a data table of known locked periods for the two database shards. Some embodiments may then determine that the database transaction request is obtained during a synchronization of the first or second record by determining that the first transaction is received in at least one of the known locked periods indicated by the data table for at least one of the two database shards.

Some embodiments may perform synchronization operations, other batch operations, or other types of locking operations for individual records in a database shard such that other records in the same database shard are not locked. For example, some embodiments may perform a synchronization of a first record in a first database shard such that the synchronization does not occur concurrently with a synchronization of an adjacently indexed record of the first record in the first database shard. Alternatively, or additionally, some embodiments may perform locking operations for multiple records of a database shard or all records of a database shard within a defined locked window. Some embodiments may perform a batch synchronization operation that locks multiple records of a database shard or even all records of a database shard. For example, some embodiments may perform a batch synchronization operation such that the synchronization of a first record of the second database shard occurs concurrently with the synchronization of an additional record of the second database shard. Furthermore, some embodiments may perform synchronization or other batch operations for a defined period of time. For example, some embodiments may schedule a synchronization operation as part of a batch operation that lasts for at least an hour. Furthermore, some embodiments may perform synchronization or other batch operations on a periodic interval. For example, some embodiments may schedule a synchronization operation as part of a batch operation that occurs on a daily, weekly, or monthly basis.

Some embodiments may determine that the database transaction request is obtained during the synchronization of the first record or the second record and, in response, perform operations described by block 320. Otherwise, operations of the process 300 may proceed to operations described by block 312. As indicated by operations described for block 312, some embodiments may effectuate the database transaction caused by the database transaction request without selecting an effective unlocked period to assign to the database transaction.

As stated elsewhere, some embodiments may forego locking operations during an update sequence. In such cases, instead of determining whether a database transaction request is obtained during the locked period, some embodiments may determine whether the database transaction request is obtained during a non-locking update sequence. In cases where the database transaction request is obtained during the non-locking update sequence, some embodiments may proceed to operations described by block 320. Otherwise, operations of the process 300 may proceed to one or more operations described by block 312. For example, some embodiments may determine that a database transaction request affecting a first record in a first database shard and a second record in a second database shard during a non-locking checkpoint process of the first database and, in response, proceed to one or more operations described by block 320.

Some embodiments may select an effective unlocked period, as indicated by block 320. Some embodiments may select an effective unlocked period directly by simply selecting an identifier of that period. For example, in database systems where synchronization operations lock a record, a locked period for a record may be a period during which a record is undergoing synchronization, and an unlocked period may be or include a non-synchronized period. If a synchronization separates a first unlocked period labeled "day 1" from a second unlocked period labeled "day 2," some embodiments may select "day 2" as the effective unlocked period. Alternatively, or additionally, some embodiments may select a specific time that maps to one of the unlocked periods. For example, after determining that a transaction was obtained during a locked window of a synchronization, some embodiments may select an effective timestamp that occurs before the locked window started, where this effective timestamp is within the first unlocked period. It should be understood that various types of operations may end an unlocked period while some embodiments refer to an effective unlocked period, other embodiments may select an effective unlocked period for database systems in which other operations may lock a record. For example, in cases where data policy compliance operations may require all records to be locked on a regular interval, some embodiments may select an effective unlocked period from a set of unlocked periods defined by the data policy compliance operations.

Some embodiments may be configured to select the earlier unlocked period as the effective unlocked period. For example, some embodiments may obtain a database transaction request indicating a change in values between a first account record and a second account record while the second account record is locked by synchronization operation. Based on a determination that the database transaction request was obtained during the synchronization, some embodiments then select an effective unlocked period by selecting an effective time for a database transaction caused by the database transaction request as being equal to the end of the first unlocked period. As described elsewhere in this disclosure, some embodiments may determine that the effective unlocked period occurs earlier than the synchronization itself and, in response, perform back-dating operations based on the database transaction request.

Some embodiments may be configured to select a later unlocked period as the effective unlocked period. For example, some embodiments may obtain a database transaction request indicating a change in values between a first account record and a second account record while the first account record is locked by synchronization operations. While some embodiments may select an earlier unlocked period of the first account record for use as the effective unlocked period using operations described above, some embodiments may select the later unlocked period of the first account record for use as the effective unlocked period. As described elsewhere in this disclosure, some embodiments may determine that the effective unlocked period occurs later than the synchronization itself and, in response, perform forward-dating operations based on the database transaction request.

Some embodiments may select an effective unlocked period by selecting an effective timestamp. In some embodiments, the effective timestamp may be set to be at a limit of an effective unlocked period. For example, some embodiments may select a first unlocked period as an effective unlocked period and then select the beginning or end of the first unlocked period for use as an effective timestamp. Alternatively, some embodiments may select an effective timestamp that is between the limits of a selected unlocked period. For example, if an effective unlocked period is defined by the time interval between 1678280400 and 1678284000, some embodiments may determine the timestamp 1678283000. When updating an update sequence, some embodiments may search through an update history for a transaction timestamp for a first transaction that is temporally nearest to the timestamp 1678283000. After finding the temporally nearest transaction for a timestamp of the first transaction, some embodiments may insert the newly obtained timestamp and then apply the transaction in the order defined by the updated sequence.

In cases where locking operations are not performed when updating a database shard, the selection of a period may be described as either selecting a first recorded period or a second recorded period. For example, in cases where a database transaction request indicating updates to records in both a first and second database shard is obtained during a checkpoint process for the first database shard, some embodiments may select either the first checkpoint-recorded period and a second checkpoint-recorded period as the effective recorded period for the database shard. As described elsewhere in this disclosure, some embodiments may enforce a synchronized selection for the effective recorded period when updating the respective first and second database shards. It should further be understood that an unlocked period may be a recorded period in cases where a checkpoint process or other update sequence records data related to the state of one or more records during that unlocked period.

Some embodiments may update a set of update sequences of the first record and the second record indicating that the database transaction request occurred during the effective unlocked period, as indicated by block 324. An update sequence may include a schedule of transactions that had occurred for one or more periods, including an unlocked period or a locked period. In many cases, updating the update schedules of a pair of records may result in a requirement to perform forward-dating or back-dating operations for at least one of the pair of records. In many cases, the type of operations used may depend on the type of effective unlocked period mapped to the transaction. Some embodiments may modify a transaction schedule for a record by inserting a transaction into an earlier time relative to a current time of operations and using back-dating methods to prevent inconsistencies with respect to the records values. Alternatively, or additionally, some embodiments may modify the transaction schedule by inserting a transaction into a later time relative to the current time of operations and using forward-dating methods to prevent inconsistencies with respect to the records values. Furthermore, it should be understood that, in database systems such that operations other than synchronizations are locking operations, unlocked periods may be defined by types of events other than synchronization events. For example, after some embodiments select an effective unlocked period defined by a data policy compliance operation, some embodiments may update a set of update sequences to indicate that a database transaction request is to occur during the effective unlocked period.

Some embodiments may interact with independent servers that cannot be directly controlled by requesting confirmations of effective date selection. For example, a local application may control a local database system storing a local database shard that includes a first record and receive a first transaction request from external applications or services. In some embodiments, the first transaction request may relate to updates to the first record and a second record that is stored in an independent database system that is independent of the local database system and is otherwise not accessible to the local application. After selecting an effective unlocked period, some embodiments may then send an identifier of the effective unlocked period to both the first and second database systems (e.g., via a request message). In the case of the independent database system, some embodiments may then wait for a response message indicating a commitment to the effective unlocked period from the independent database system before updating the local database system based on the effective date selection. By waiting for an external commitment message, some embodiments can prevent a transaction amount from being erroneously increased or decreased. In cases where the response message is not received, some embodiments may cease operations to update a record based on the transaction or even reverse a set of already-performed operations initiated by the transaction. For example, after receiving a response from an independent data system indicating a rejection of a request to change the effective time, some embodiments may reverse a forward-dating operation of a record indicated by the transaction.

As described elsewhere, some embodiments may forego locking periods without loss in generality of the operations described in this disclosure. For example, some embodiments may apply a checkpoint process for each database shard of a set of database shards, where a non-locking checkpoint process may separate an earlier checkpoint-recorded period from a later checkpoint-recorded period for each database shard. When a database transaction request affecting records in first and second database shards is obtained, some embodiments may update the update sequences of the first and second database shards (e.g., the checkpoint processes of the first and second database shards) such that the database transaction is indicated to have occurred during the earlier checkpoint-recorded periods of the first and second database shards. Alternatively, if a later checkpoint-recorded period is selected (e.g., selected by operations described for block 320), some embodiments may exclude a database transaction caused by the database transaction request from the earlier checkpoint-recorded periods of the first and second database shards, and may instead indicate the database transaction as being performed during the later checkpoint-recorded period of both the first and second database shards.

Some embodiments may synchronize the first record or the second record based on the associated set of updated update sequences, as indicated by block 336. Some embodiments may finalize the consistency of a pair of records with respect to their transactions by performing a second synchronization operation with respect to any non-synchronized records. For example, after receiving instructions to perform a set of database transactions involving a first record while performing or causing a synchronization operation of the first record, some embodiments may then perform operations of the process 300 to select an effective unlocked period. Some embodiments may then modify the update sequence for the first record to reflect the occurrence of the set of database transactions during the effective unlocked period. Some embodiments may perform or cause an additional synchronization of the first record after updating the update sequence. By performing the additional synchronization or causing the performance of the additional synchronization, some embodiments may then finalize any database transactions or other types of database record updates configured to occur at a later effective unlocked period. Furthermore, it should be understood that other types of locking operations may be applied in addition to or in lieu of synchronization operations. For example, some embodiments may apply locking operations to a record that restructure a record based on an updated update sequence.

For cases where no locking operation is performed or locking operations do not separate periods, some embodiments may still apply one or more sets of update sequences to records to enforce the synchronization of a selected effective period. For example, some embodiments may obtain a database transaction request affecting first and second records in first and second database shards, respectively. In response, some embodiments may update the update sequences of the first and second database shards such that a database transaction caused by the database transaction request is indicated to have occurred during either (1) the earlier checkpoint-recorded periods of the first and second database shards or (2) the later checkpoint-recorded periods of the first and second database shards. Some embodiments may then apply the respective update sequences (e.g., respective checkpoint processes) at their respective times for each respective database shard.

Some embodiments may generate one or more reports during or after synchronization. For example, some embodiments may generate a first report as part of a first synchronization of a first database shard and then generate a second report as part of an additional synchronization of the first database shard. A report may indicate the respective aggregated change of each respective record of a database shard or a database system as a whole (e.g., a database system including multiple shards), a sum of the aggregated changes, a difference in the aggregated changes with respect to the aggregated changes of previous days or other previous intervals, etc. For example, some embodiments may generate a report titled "Day 1999 Jan. 5" that indicates the total change in a quantity titled "user amount" for a plurality of records. The plurality of records may be distributed across multiple data shards for a particular set of unlocked periods. Some embodiments may then communicate one or both reports to an internal data storage device or an external data storage device for user review.

Some embodiments may detect that an activity pattern associated with at least one of the records triggers a malicious activity indicator. For example, some embodiments may analyze updates to a first and second record and indicate at least one of the pair of records with a malicious activity flag. In some embodiments, to remain consistent with synchronization operations or reporting operations, some embodiments may associate a selected effective non-synchronization period with the malicious activity flag (e.g., by associating the determined effective timestamp with the malicious activity flag). In many cases, such associations can reduce the likelihood of a miscalculation involving the malicious activity flag or a miscategorization that indicates the malicious activity flag as erroneous.

Some embodiments may rescale the database system that includes the first database shard or second database shard, as indicated by block 340. Some embodiments may determine a proportional amount or absolute number of records that are locked. Some embodiments may then determine that the proportional amount or absolute number of locked records is greater than a threshold or otherwise satisfies a set of scaling criteria (e.g., batch processing time is exceeding a time limit) and, in response, rescale the database system such that records are redistributed throughout the first database shard, second database shard, other database shards of the database system, or other data storage constructs. For example, some embodiments may determine that, after a synchronization operation of the first record that is performed as part of a synchronization operation for the first database shard, the total number of records that were locked is greater than a locked records count threshold. In response, some embodiments may rescale the database system by either increasing a storage capacity or throughput capability of the first database shard or redistributing the first record or some other record of the first database shard to another database shard.

Figure 4:
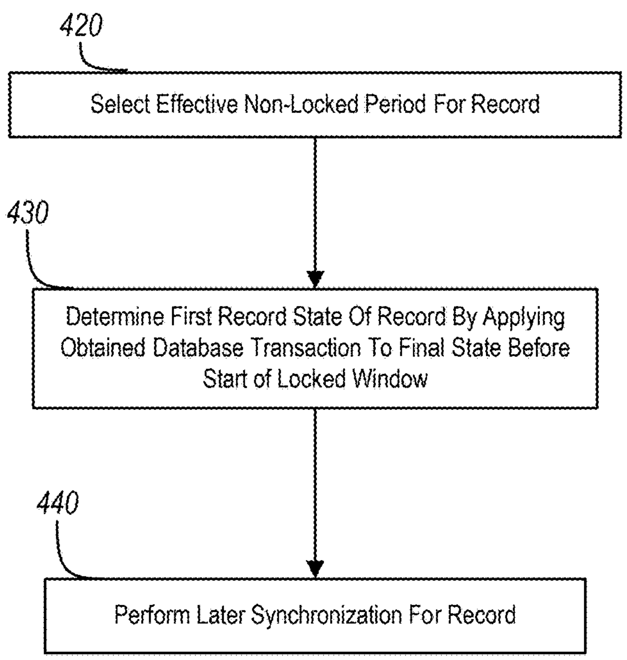
FIG. 4 is a flowchart of a process for performing synchronization to enable value consistency across records, in accordance with some embodiments.

FIG. 4 is a flowchart of a process 400 for performing synchronization to enable value consistency across records, in accordance with some embodiments. Some embodiments may select an effective unlocked period, as indicated by block 420. Some embodiments may perform operations the same as those described for block 320 to apply an effective unlocked period. Some embodiments may be configured to select an earlier unlocked period as the effective unlocked period (e.g., by selecting the ending time of the earlier unlocked period for use as the effective execution timestamp for a database transaction). Alternatively, some embodiments may be configured to select a later available time period as the effective unlocked period (e.g., by selecting the starting time of the later unlocked period as the execution timestamp for a database transaction).

Some embodiments may determine a first record state of the record by applying an obtained database transaction caused by a request to a final state before the start of the locked window, as indicated by block 430. Some embodiments may update a record state by adding or otherwise aggregating each of the transaction requests for a first unlocked period recorded in an update sequence. For example, some embodiments may determine a first record state based on a sequence of three transaction requests to update a record. Some embodiments may update the sequence of three transaction requests with an obtained database transaction request to form a sequence of four database transactions and then determine a first record state after applying the changes indicated by the updated sequence of updates to the record. If the effective unlocked period for a transaction is an earlier period with respect to the locked window, some embodiments may apply the transaction before a synchronization operation. Furthermore, an obtained database transaction request may be used to update this update sequence by appending the transaction request indicated by the obtained database transaction request to the update sequence.

It should be understood that, if a database transaction for a record is assigned an effective unlocked period that is later than the locked window of a record synchronization operation for the record, some applications may simply treat a received transaction request as any other transaction request that was received without consideration for a synchronization operation or another locking operation. For example, some embodiments may determine that an effective unlocked period is later than the first synchronization. In response, some embodiments may apply an original set of database transactions to a first record and determine an updated record state after the first synchronization by applying the database transaction that is scheduled to occur during the effective unlocked period. In such a scenario, the database transaction may be a first database transaction that is indicated to be part of a sequence of subsequent database transactions occurring after the first synchronization.

Some embodiments may perform a later synchronization of the record, as indicated by block 440. As described elsewhere, some embodiments may perform synchronization operations to verify record consistency for one or more records. For example, some embodiments may lock a record during a synchronization and, during the locked window, aggregate later transactions for a record. Furthermore, in addition to synchronization or in lieu of synchronization, some embodiments may apply other locking operations to a record to execute one or more operations indicated by an update sequence for the record.

It should be understood that, while operations described by the process 300 and the process 400 are applicable to distributed databases in which data is horizontally distributed into database shards, some embodiments may apply such operations described in this disclosure to a centralized system. Furthermore, some embodiments may use both a distributed database and a central database, where at least one of the two databases may be used as a backup database storing backup records of user records or other records described in this disclosure. For example, some embodiments may synchronize or otherwise lock a first record in a centralized data system without locking a second record in the centralized data system, where the centralized data system may include a data storage of a mainframe server. Some embodiments may then perform operations of the process 300 or the process 400 to select an effective unlocked period for the transaction. Some embodiments may treat these records in the centralized data system as backup records.

As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety (i.e., the entire portion), of a given item (e.g., data) unless the context clearly dictates otherwise. Furthermore, a "set" may refer to a singular form or a plural form, such that a "set of items" may refer to one item or a plurality of items.

In some embodiments, the operations described in this disclosure may be implemented in a set of processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on a set of non-transitory, machine-readable media, such as an electronic storage medium. Furthermore, the use of the term "media" may include a single medium or combination of multiple media, such as a first medium and a second medium. A set of non-transitory, machine-readable media storing instructions may include instructions included on a single medium or instructions distributed across multiple media. The processing devices may include one or more devices configured through hardware, firmware, and/or software to be specifically designed for the execution of one or more of the operations of the methods. For example, it should be noted that one or more of the devices or equipment discussed in relation to FIGS. 1-2 could be used to perform one or more of the operations described in relation to FIGS. 3-4.

It should be noted that the features and limitations described in any one embodiment may be applied to any other embodiment herein, and a flowchart or examples relating to one embodiment may be combined with any other embodiment in a suitable manner, done in different orders, or done in parallel. Furthermore, not all operations of a flowchart need to be performed. For example, some embodiments may perform operations of block 430 without performing operations of block 440. In addition, the systems and methods described herein may be performed in real time. It should also be noted that the systems and/or methods described above may be applied to, or used in accordance with, other systems and/or methods.

In some embodiments, the various computer systems and subsystems illustrated in FIG. 1 or FIG. 2 may include one or more computing devices that are programmed to perform the functions described herein. The computing devices may include one or more electronic storages (e.g., a set of databases accessible to one or more applications depicted in the system 100), one or more physical processors programmed with one or more computer program instructions, and/or other components. For example, the set of databases may include a relational database such as a PostgreSQL™ database or MySQL database. Alternatively, or additionally, the set of databases or other electronic storage used in this disclosure may include a non-relational database, such as a Cassandra™ database, MongoDB™ database, Redis database, Neo4j™ database, Amazon Neptune™ database, etc.

The computing devices may include communication lines or ports to enable the exchange of information with a set of networks (e.g., a network used by the system 100) or other computing platforms via wired or wireless techniques. The network may include the internet, a mobile phone network, a mobile voice or data network (e.g., a 5G or Long-Term Evolution (LTE) network), a cable network, a public switched telephone network, or other types of communications networks or combination of communications networks. A network described by devices or systems described in this disclosure may include one or more communications paths, such as Ethernet, a satellite path, a fiber-optic path, a cable path, a path that supports internet communications (e.g., IPTV), free-space connections (e.g., for broadcast or other wireless signals), Wi-Fi, Bluetooth, near field communication, or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Each of these devices described in this disclosure may also include electronic storages. The electronic storages may include non-transitory storage media that electronically stores information. The storage media of the electronic storages may include one or both of (i) system storage that is provided integrally (e.g., substantially non-removable) with servers or client computing devices, or (ii) removable storage that is removably connectable to the servers or client computing devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). An electronic storage may store software algorithms, information determined by the processors, information obtained from servers, information obtained from client computing devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent the processing functionality of a plurality of devices operating in coordination. The processors may be programmed to execute computer program instructions to perform functions described herein of subsystems described in this disclosure or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems described herein is for illustrative purposes, and is not intended to be limiting, as any of the subsystems described in this disclosure may provide more or less functionality than is described. For example, one or more of subsystems described in this disclosure may be eliminated, and some or all of its functionality may be provided by other ones of subsystems described in this disclosure. As another example, additional subsystems may be programmed to perform some or all of the functionality attributed herein to one of the subsystems described in this disclosure.

With respect to the components of computing devices described in this disclosure, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Further, some or all of the computing devices described in this disclosure may include a user input interface and/or user output interface (e.g., a display) for use in receiving and displaying data. In some embodiments, a display such as a touchscreen may also act as a user input interface. It should be noted that in some embodiments, one or more devices described in this disclosure may have neither user input interface nor displays and may instead receive and display content using another device (e.g., a dedicated display device such as a computer screen and/or a dedicated input device such as a remote control, mouse, voice input, etc.). Additionally, one or more of the devices described in this disclosure may run an application (or another suitable program) that performs one or more operations described in this disclosure.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment may be combined with one or more features of any other embodiment.

As used throughout this application, the word "may" is used in a permissive sense (i.e., meaning having the potential to), rather than the mandatory sense (i.e., meaning must). The words "include," "including," "includes," and the like mean including, but not limited to. As used throughout this application, the singular forms "a," "an," and "the" include plural referents unless the context clearly indicates otherwise. Thus, for example, reference to "an element" or "the element" includes a combination of two or more elements, notwithstanding the use of other terms and phrases for one or more elements, such as "one or more." The term "or" is non-exclusive (i.e., encompassing both "and" and "or"), unless the context clearly indicates otherwise. Terms describing conditional relationships (e.g., "in response to X, Y," "upon X, Y," "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Statements in which a plurality of attributes or functions are mapped to a plurality of objects (e.g., a set of processors performing steps/operations A, B, C, and D) encompass all such attributes or functions being mapped to all such objects and subsets of the attributes or functions being mapped to subsets of the attributes or functions (e.g., both/all processors each performing steps/operations A-D, and a case in which processor 1 performs step/operation A, processor 2 performs step/operation B and part of step/operation C, and processor 3 performs part of step/operation C and step/operation D), unless otherwise indicated. Further, unless otherwise indicated, statements that one value or action is "based on" another condition or value encompass both instances in which the condition or value is the sole factor and instances in which the condition or value is one factor among a plurality of factors.

Unless the context clearly indicates otherwise, statements that "each" instance of some collection has some property should not be read to exclude cases where some otherwise identical or similar members of a larger collection do not have the property (i.e., each does not necessarily mean each and every). Limitations as to the sequence of recited steps should not be read into the claims unless explicitly specified (e.g., with explicit language like "after performing X, performing Y") in contrast to statements that might be improperly argued to imply sequence limitations (e.g., "performing X on items, performing Y on the X'ed items") used for purposes of making claims more readable rather than specifying a sequence. Statements referring to "at least Z of A, B, and C," and the like (e.g., "at least Z of A, B, or C"), refer to at least Z of the listed categories (A, B, and C) and do not require at least Z units in each category. Unless the context clearly indicates otherwise, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Furthermore, unless indicated otherwise, updating an item may include generating the item or modifying an existing item. Thus, updating a record may include generating a record or modifying the value of an already-generated value in a record.

Unless the context clearly indicates otherwise, ordinal numbers used to denote an item do not define the item's position. For example, an item that may be a first item of a set of items even if the item is not the first item to have been added to the set of items or is otherwise indicated to be listed as the first item of an ordering of the set of items. Thus, for example, if a set of items is sorted in a sequence from "item 1," "item 2," and "item 3," a first item of a set of items may be "item 2" unless otherwise stated.

The present techniques will be better understood with reference to the following enumerated embodiments:

1. A method comprising: obtaining a database transaction indicating updates to a first record stored in a first database shard and a second record stored in a second database shard during a first synchronization; based on receiving the database transaction during the first synchronization, selecting an effective unlocked period indicating a period during which the database transaction occurred; causing an update to the second record based on the effective unlocked period; and causing an update to the first record based on the effective unlocked period.

2. A method comprising: obtaining a database transaction indicating updates to a first record stored in a first database shard and a second record stored in a second database shard during a first synchronization, the first synchronization separating a first unlocked period of the second record from a second unlocked period of the second record, wherein the database transaction is obtained during a first unlocked period of the first record; in response to obtaining the database transaction during the first synchronization, selecting an effective unlocked period based on the first or second unlocked period of the second record; updating, after the first synchronization, the second record stored in the second database shard by updating an update sequence of the second record to indicate that the database transaction occurred during the effective unlocked period; and synchronizing the first record during a second synchronization by updating an update sequence of the first record to indicate that the database transaction occurred during the effective unlocked period.

3. A method comprising: obtaining a database transaction indicating updates to a first record stored in a first database shard and a second record stored in a second database shard during a first synchronization, the first synchronization separating a first recorded period of the second record from a second recorded period of the second record, wherein the database transaction is obtained during a first recorded period of the first record; in response to obtaining the database transaction during the first synchronization, selecting an effective recorded period based on the first or second recorded period of the second record; updating, after the first synchronization, the second record stored in the second database shard by updating an update sequence of the second record to indicate that the database transaction occurred during the effective recorded period; and synchronizing the first record during a second synchronization by updating an update sequence of the first record to indicate that the database transaction occurred during the effective recorded period.

4. A method comprising: obtaining a database transaction indicating updates to a first record stored in a first database shard and a second record stored in a second database shard during a first synchronization of the second record, the first synchronization separating a first unlocked period of the second record from a second unlocked period of the second record, wherein the database transaction is obtained during a first unlocked period of the first record; in response to obtaining the database transaction during the first synchronization, selecting an effective unlocked period; updating the second record by updating an update sequence of the second record to indicate that the database transaction occurred during the effective unlocked period; and synchronizing the first record during a second synchronization by updating an update sequence of the first record to indicate that the database transaction occurred during the effective unlocked period.

5. A method comprising: obtaining a database transaction indicating updates to a first record stored in a first database shard and a second record stored in a second database shard during a first synchronization, the first synchronization separating a first unlocked period of the second record from a second unlocked period of the second record, wherein the database transaction is obtained during a first unlocked period of the first record; based on receiving the database transaction during the first synchronization, selecting an effective unlocked period; updating the second record by updating a second update sequence of the second record to indicate that the database transaction occurred during the effective unlocked period; and causing an update to the first record by causing an update to a first update sequence to indicate that the database transaction occurred during the effective unlocked period.

6. The method of any of the embodiments above, wherein the database transaction is a first database transaction, wherein the effective unlocked period is later than the first synchronization, and wherein synchronizing the first record comprises: determining a result indicating that the effective unlocked period is later than the first synchronization; in response to the result indicating that the effective unlocked period is later than the first synchronization, determining a first record state for the first record based on a plurality of database transactions indicated to have occurred during the first unlocked period of the first record; and generating an updated record state based on the first record state and a sequence of subsequent database transactions, the sequence of subsequent database transactions comprising the first database transaction.

7. The method of any of the embodiments above, wherein the database transaction is a first database transaction, wherein the effective unlocked period is earlier than the first synchronization, and wherein updating the second record comprises: determining a first record state for the second record based on a plurality of database transactions indicated to have occurred during the first unlocked period of the second record; and determining an updated record state based on the first record state and the first database transaction, wherein synchronizing the second record comprises synchronizing the second record based on the updated record state during the second synchronization.

8. The method of any of the embodiments above, further comprising determining an effective timestamp associated with the effective unlocked period, wherein the database transaction is a first database transaction, and wherein updating the update sequence comprises searching through an update history to determine a timestamp nearest to the effective timestamp.

9. The method of claim 5, wherein: the effective unlocked period is selected as being mapped to the first unlocked period of the first record; the database transaction causes a malicious activity flag to be associated with the first record; and the malicious activity flag is associated with the first unlocked period of the first record.

10. The method of any of the embodiments above, further comprising determining a result indicating that the database transaction is occurring during a known locked period based on a data table of known locked periods, wherein selecting the effective unlocked period comprises selecting the effective unlocked period based on the result indicating that the database transaction is occurring during the known locked period.

11. The method of any of the embodiments above, further comprising determining a result indicating that the database transaction is occurring during a known locked period by sending a query to a containerized application in communication with the second database shard, wherein selecting the effective unlocked period comprises selecting the effective unlocked period based on the result indicating that the database transaction is occurring during the known locked period.

12. The method of any of the embodiments above, wherein: the second database shard comprises a third record; and the first synchronization does not occur concurrently with a synchronization of the third record.

13. The method of any of the embodiments above, wherein: the second database shard comprises an additional record; and the first synchronization occurs concurrently with an additional synchronization of the additional record as part of a batch operation of the second database shard.

14. The method of any of the embodiments above, wherein a duration of the first synchronization is less than or equal to one hour.

15. The method of any of the embodiments above, wherein: the first database shard is stored in a first database system; the second database shard is stored in a second database system that is independent from the first database system; and the method further comprise: sending a request comprising an identifier of the effective unlocked period to the first database system and the second database system; and obtaining a response message indicating a commitment to the effective unlocked period from the first database system, wherein updating the second database shard comprises updating the second database system based on the response message.

16. The one or more non-transitory, machine-readable media of claim 13, wherein the request is a first request, further comprising: obtaining a second database transaction indicating updates to a third record stored in a third database system and a fourth record stored in the second database system; sending a second request comprising an identifier of a second effective unlocked period to the third database system and the second database system; and reversing operations related to the second database transaction based on not receiving a response message indicating a commitment to the effective unlocked period from the first database system.

17. The method of any of the embodiments above, further comprising storing a backup record of the second record in a third database, wherein updating the second database shard comprises updating the backup record based on the second update sequence.

18. The one or more non-transitory, machine-readable media of claim 15, wherein the third database is hosted on a mainframe server.

19. The method of any of the embodiments above, the method further comprising: determining a first record state based on the first record and a second record state based on the second record; and generating a report corresponding with the first unlocked period of the first record based on the first record state and the second record state.

20. The method of any of the embodiments above, wherein the database transaction is a first database transaction, wherein the effective unlocked period is later than the first synchronization, and wherein causing the update to the first record comprises: determining whether the effective unlocked period is later than the first synchronization; in response to a determination that the effective unlocked period is later than the first synchronization, determining a first record state for the first record based on a plurality of database transactions indicated to have occurred during the first unlocked period of the first record; and generating an updated record state based on the first record state and a sequence of subsequent database transactions, the sequence of subsequent database transactions comprising the database transaction.

21. The method of any of the embodiments above, wherein selecting the effective unlocked period comprises: determining whether the database transaction is occurring during a known locked period by sending a query to a containerized application in communication with the second database shard; and selecting the effective unlocked period based on a determination that the database transaction is occurring during the known locked period.

22. The method of any of the embodiments above, wherein: the second database shard comprises a third record; and the first synchronization does not occur concurrently with a synchronization of the third record.

23. The method of any of the embodiments above, wherein: the first database shard is stored in a first database system; the second database shard is stored in a second database system that is independent from the first database system; and the operations further comprise: sending a request comprising an identifier of the effective recorded period to the first database system and the second database system; and obtaining a response message indicating a commitment to the effective recorded period from the first database system, wherein updating the second database shard comprises updating the second database system based on the response message.

24. The method of any of the embodiments above, wherein the request is a first request, further comprising: obtaining a second database transaction indicating updates to a third record stored in a third database system and a fourth record stored in the second database system; sending a second request comprising an identifier of a second effective recorded period to the third database system and the second database system; and reversing operations related to the second database transaction based on not receiving a response message indicating a commitment to the effective recorded period from the first database system.

25. The method of any of the embodiments above, further comprising storing a backup record of the second record in a third database, wherein updating the second database shard comprises updating the backup record based on the second update sequence.

26. The method of any of the embodiments above, wherein the third database is hosted on a mainframe server.

27. The method of any of the embodiments above, the operations further comprising: determining a first record state based on the first record and a second record state based on the second record; and generating a report corresponding with the first recorded period of the first record based on the first record state and the second record state.

28. The method of any of the embodiments above, wherein the database transaction is a first database transaction, wherein the effective recorded period is later than the first synchronization, and wherein causing the update to the first record comprises: determining whether the effective recorded period is later than the first synchronization; in response to a determination that the effective recorded period is later than the first synchronization, determining a first record state for the first record based on a plurality of database transactions indicated to have occurred during the first recorded period of the first record; and generating an updated record state based on the first record state and a sequence of subsequent database transactions, the sequence of subsequent database transactions comprising the database transaction.

29. The method of any of the embodiments above, wherein selecting the effective recorded period comprises: determining whether the database transaction is occurring during a known locked period by sending a query to a containerized application in communication with the second database shard; and selecting the effective recorded period based on a determination that the database transaction is occurring during the known locked period.

30. The method of any of the embodiments above, wherein: the second database shard comprises a third record; and the first synchronization does not occur concurrently with a synchronization of the third record.

31. One or more tangible, non-transitory, machine-readable media storing instructions that, when executed by a set of processors, cause the set of processors to effectuate operations comprising those of any of embodiments 1 to 30.

32. A system comprising: a set of processors and a set of media storing computer program instructions that, when executed by the set of processors, cause the set of processors to effectuate operations comprising those of any of embodiments 1 to 30.

What is claimed is:

1. A system for performing staggered synchronization across records stored in different database shards, the system comprising one or more non-transitory, machine-readable media storing program instructions that, when executed by one or more processors, perform operations comprising:

during (i) an unlocked period of a first record stored in a first database shard and (ii) a first synchronization of a second record, stored in a second database shard, that occurred between a first unlocked period of the second record and a second unlocked period of the second record, obtaining a database transaction request indicating updates to the first record and the second record;

in response to obtaining the database transaction request during the first synchronization, selecting an effective unlocked period based on the first or second unlocked period of the second record;

updating, after the first synchronization, the second record stored in the second database shard by updating an update sequence of the second record to indicate that a database transaction caused by the database transaction request occurred during the effective unlocked period; and synchronizing the first record during a second synchronization by updating an update sequence of the first record to indicate that the database transaction occurred during the effective unlocked period.

2. A method comprising:

obtaining a database transaction request indicating updates to a first record stored in a first database shard and a second record stored in a second database shard during a first synchronization of the second record, the first synchronization separating a first unlocked period of the second record from a second unlocked period of the second record, wherein the database transaction request is obtained during a first unlocked period of the first record;

in response to obtaining the database transaction request during the first synchronization, selecting an effective unlocked period;

updating the second record by updating an update sequence of the second record to indicate that a database transaction caused by the database transaction request occurred during the effective unlocked period; and synchronizing the first record during a second synchronization by updating an update sequence of the first record to indicate that the database transaction occurred during the effective unlocked period.

3. The method of claim 2, wherein:

selecting the effective unlocked period comprises selecting the second unlocked period of the second record as the effective unlocked period; and synchronizing the first record comprises:

in connection with the second unlocked period of the second record being selected as the effective unlocked period in lieu of the first unlocked period of the second record, determining a result indicating that the effective unlocked period is later than the first synchronization;

in response to the result indicating that the effective unlocked period is later than the first synchronization, determining a first record state for the first record based on a plurality of database transactions indicated to have occurred during the first unlocked period of the first record; and generating an updated record state for the first record based on (i) the first record state and (ii) a sequence of subsequent database transactions comprising the database transaction, wherein the first record is synchronized during the second synchronization based on the updated record state.

4. The method of claim 2, wherein:

selecting the effective unlocked period comprises selecting the first unlocked period of the second record as the effective unlocked period; and updating the second record comprises:

in connection with the first unlocked period of the second record being selected as the effective unlocked period in lieu of the second unlocked period of the second record, determining a first record state for the second record based on a plurality of database transactions indicated to have occurred during the first unlocked period of the second record; and determining an updated record state for the second record based on the first record state and the database transaction, wherein the second record is updated based on the updated record state.

5. The method of claim 2, wherein updating the update sequence of the second record comprises:

searching through an update history to determine a timestamp nearest to an effective timestamp associated with the effective unlocked period; and updating the update sequence of the second record, using the timestamp nearest the effective timestamp associated with the effective unlocked period, to indicate that the database transaction occurred during the effective unlocked period.

6. The method of claim 5, wherein:

the effective unlocked period is selected as being mapped to the first unlocked period of the first record;

the database transaction causes a malicious activity flag to be associated with the first record; and the malicious activity flag is associated with the first unlocked period of the first record.

7. The method of claim 2, further comprising determining a result indicating that the database transaction is occurring during a known locked period based on a data table of known locked periods, wherein selecting the effective unlocked period comprises selecting the effective unlocked period based on the result indicating that the database transaction is occurring during the known locked period.

8. The method of claim 2, further comprising determining a result indicating that the database transaction is occurring during a known locked period by sending a query to a containerized application in communication with the second database shard, wherein selecting the effective unlocked period comprises selecting the effective unlocked period based on the result indicating that the database transaction is occurring during the known locked period.

9. The method of claim 2, wherein:

the second database shard comprises a third record; and the first synchronization does not occur concurrently with a synchronization of the third record.

10. The method of claim 2, wherein:

the second database shard comprises an additional record; and the first synchronization occurs concurrently with an additional synchronization of the additional record as part of a batch operation of the second database shard.

11. The method of claim 2, wherein a backup record of the second record is stored in a third database, the method further comprising updating the backup record in the third database based on the update sequence of the second record.

12. One or more non-transitory, machine-readable media storing program instructions that, when executed by one or more processors, perform operations comprising:

during (i) an unlocked period of a first record stored in a first database shard and (ii) a first synchronization of a second record, stored in a second database shard, that occurred between a first recorded period of the second record and a second recorded period of the second record, obtaining a database transaction request indicating updates to the first record and the second record;

based on the database transaction request being obtained during the first synchronization, selecting an effective recorded period;

updating the second record by updating a second update sequence of the second record to indicate that a database transaction caused by the database transaction request occurred during the effective recorded period; and causing an update to the first record by causing an update to a first update sequence to indicate that the database transaction occurred during the effective recorded period.

13. The one or more non-transitory, machine-readable media of claim 12, wherein:

the first database shard is stored in a first database system;

the second database shard is stored in a second database system that is independent from the first database system; and the operations further comprise:

sending a request comprising an identifier of the effective recorded period to the first database system and the second database system; and obtaining a response message indicating a commitment to the effective recorded period from the first database system, wherein the second record is updated based on the response message.

14. The one or more non-transitory, machine-readable media of claim 13, the operations further comprising:

obtaining a second database transaction request indicating updates to a third record stored in a third database system and a fourth record stored in the second database system;

sending a second request comprising an identifier of a second effective recorded period to the third database system and the second database system; and reversing operations related to the second database transaction request based on not receiving a response message indicating a commitment to the effective recorded period from the first database system.

15. The one or more non-transitory, machine-readable media of claim 12, further comprising updating, based on the second update sequence of the second record, a backup record of the second record that is stored in a third database.

16. The one or more non-transitory, machine-readable media of claim 15, wherein the third database is hosted on a mainframe server.

17. The one or more non-transitory, machine-readable media of claim 12, the operations further comprising:

determining a first record state based on the first record and a second record state based on the second record; and generating a report corresponding with the first recorded period of the first record based on the first record state and the second record state.

18. The one or more non-transitory, machine-readable media of claim 12, wherein causing the update to the first record comprises:

in response to a determination that the effective recorded period is later than the first synchronization, determining a first record state for the first record based on a plurality of database transactions indicated to have occurred during the first recorded period of the first record; and generating an updated record state based on the first record state and a sequence of subsequent database transactions comprising the database transaction, wherein the first record is updated based on the updated record state.

19. The one or more non-transitory, machine-readable media of claim 12, wherein selecting the effective recorded period comprises:

determining whether the database transaction is occurring during a known locked period by sending a query to a containerized application in communication with the second database shard; and selecting the effective recorded period based on a determination that the database transaction is occurring during the known locked period.

20. The one or more non-transitory, machine-readable media of claim 12, wherein selecting the effective recorded period comprises selecting the effective recorded period based on a result indicating that the database transaction occurred during a known recorded period of a set of known locked periods.

* * * * *